United States Patent
Chartrand et al.

(10) Patent No.: US 7,529,923 B2
(45) Date of Patent: May 5, 2009

(54) OPERATING SYSTEM MODE TRANSFER

(75) Inventors: Brent D. Chartrand, Cameron Park, CA (US); Rajeev K. Nalawadi, Folsom, CA (US); Alberto Martinez, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 497 days.

(21) Appl. No.: 11/173,261

(22) Filed: Jun. 30, 2005

(65) Prior Publication Data

US 2007/0005947 A1  Jan. 4, 2007

(51) Int. Cl.
   G06F 9/00 (2006.01)
   G06F 3/00 (2006.01)
(52) U.S. Cl. .................. 713/2; 713/1; 713/100; 719/319
(58) Field of Classification Search ........... 713/2, 713/1, 100; 719/319
   See application file for complete search history.

(56) References Cited

U.S. PATENT DOCUMENTS

| | | | | |
|---|---|---|---|---|
| 5,974,547 A | * | 10/1999 | Klimenko | 713/2 |
| 2005/0182922 A1 | * | 8/2005 | Guo et al. | 713/1 |
| 2005/0204181 A1 | * | 9/2005 | Montero et al. | 714/4 |

OTHER PUBLICATIONS

Hewlett-Packard Corporation, et al., "Advanced Configuration and Power Interface Specification", Revision 3.0, Sep. 2, 2004, 618 pp.
Intel Corporation, "Intel Virtualization Technology Specification for the IA-32 Intel Architecture", C97063-002, Apr. 2005, 144 pp.
Intel Corporation, "LaGrande Technology Architectural Overview", 252491-001, Sep. 2003, 10 pp.
Lawson, N., "6.16 Using and Debugging Free BSD ACPI", [online], Copyright 2004, [retrieved on Jun. 1, 2005], retrieved from the Internet at <URL: http://freebsd.active-venture.com/handbook/acpi-debug.html>.

* cited by examiner

Primary Examiner—Thomas Lee
Assistant Examiner—Michael J Brown
(74) Attorney, Agent, or Firm—Konrad Raynes & Victor LLP

(57) ABSTRACT

Provided are a method, system and program for effecting an operating system mode change from one mode to another. In one embodiment, the operating system in one mode is placed in a sleep state in which volatile memory remains active. In booting an operating system from the sleep state, a flag may be detected indicating an operating system mode transfer request. In response, contents of a selected range of volatile memory allocated to the first operating system mode may be swapped with the contents of a selected range of a reserve portion of volatile memory allocated to the second operating system mode. Booting of an operating system in the second mode may be completed using the swapped contents of the volatile memory. Additional embodiments are described and claimed.

30 Claims, 7 Drawing Sheets

OPERATING SYSTEM MODE TRANSFER

BACKGROUND

An operating system for a computer system may have different modes of operation. For example, in a general purpose mode, an operating system may permit the execution of a wide variety of different types of applications. However, in some circumstances, a more restricted mode of operation may be useful. Once such restricted mode is often referred to as a "single function" mode which substantially restricts the behavior of the system. For example, a computer system having an operating system in a single function mode may be operated as a media player such as an MP3 (MPEG (Moving Pictures Experts Group), audio layer 3) player. In one application, unneeded devices such as networking devices may be turned off to increase battery life. Moreover, when performing as a media player, the reduced functionality of the execution mode may be "locked-down" to reduce or eliminate the capability of the system to introduce unauthorized changes or "hacks" which could be used to attempt to copy content in violation of licenses or copyright laws. Still further, such a reduced functionality may be required by a license which proscribes playing protected content in a non-controlled environment such as that provided by many general purpose operating systems.

To switch modes of operation, a computer system and its operating system are typically placed in a sleep state. In one known method, the computer system and its operating system are placed in an "S4" sleep state as defined by the Advanced Configuration and Power Interface Specification (ACPI), Rev. 3.0, published Sep. 2, 2004. In the S4 sleep state, many if not all system devices including volatile memory are powered off.

FIG. 1 shows an example of an address space 10 schematically represented by ranges 12 and 14 of memory locations. These memory locations may be within a device memory mapped input/output (MMIO) address space of a Peripheral Component Interconnect (PCI) bus, for example. In this example, context data for the current operating system environment, represented as Environment A, for the current operating system mode, resides in volatile memory in memory range 14. Thus, as the system transitions to the S4 sleep state, this context data for the current operating system Environment A residing in volatile memory is typically stored (as represented by arrow 16a) in nonvolatile storage 18 such as disk drives to preserve the context data for that Environment A while the system is in the S4 sleep state.

The context data for more than one operating system environment may be stored at one time in nonvolatile storage. Hence, as the system begins to emerge from the S4 sleep state, the context data for the intended operating system environment may be retrieved from storage 18 and loaded (as represented by arrow 16b) into the volatile memory range 14. Thus, if the context data for a single function operating system mode is loaded into volatile memory as represented by Environment B instead of the context data for a general purpose operating system mode, as represented by Environment A, the operating system may boot into the single function mode rather than resuming the general purpose mode. If so, the operation of the computer system may resume as a single purpose device rather than as a general purpose device, for example.

Once operating in the single function mode, the computer system may be returned to the general purpose mode by again placing the system in the S4 sleep mode. As the system transitions to the S4 sleep state, the context data for the current operating system Environment B residing in volatile memory is typically stored (as represented by arrow 16c) in nonvolatile storage 18 to preserve the context data for that Environment B while the system is in the S4 sleep state.

As the system begins to emerge from the S4 sleep state, the context data for the general purpose operating system Environment A may be retrieved from storage and loaded (as represented by arrow 16d) into the volatile memory. Consequently, the operating system may boot into the general purpose mode rather than the single function mode. In many known mode switching processes, a substantial length of time, such as 30-40 seconds, may be utilized to accomplish the switch from one operating system mode to another.

In many computer systems, more than one type of sleep state is often available. For example, in a computer system in accordance with the ACPI specification, in sleep states designated "S1", "S2" or "S3", the contents of volatile memory are maintained. In addition, in sleep states designated S2 or S3, a resume vector is maintained which directs the system, upon emerging from the sleep state, to restore certain configurations of the system which were in place prior to the system entering the S2 or S3 sleep state. Conversely, a power state designated "S5" is like sleep state S4 in that contents of volatile memory typically are not maintained. However, unlike the S4 state, operating system environment context data is generally not saved to storage. Hence, environment context data is typically lost in the S5 state.

FIG. 2 shows a prior art example of a typical system waking from states S3-S5. Upon power on (block 30), the basic input/output system (BIOS) is entered. The BIOS is built-in software which generally determines what a computer can do without accessing programs from a disk. Typically, the BIOS contains all the code for controlling the keyboard, display screen, disk drives, serial communications, and a number of miscellaneous functions. In addition, the BIOS generally makes it possible for a computer to "boot" itself, that is, start to load the first pieces of software that start a computer. Because the operating system is generally used to run the other programs, it is usually the first piece of software loaded during the boot process.

However, the boot process often depends upon the particular state from which the system is emerging. Thus, in this example, the BIOS detects (block 32) whether the suspend state was an S4 sleep state or an S5 power state. If so, the BIOS performs (block 34) a power on self test (POST) which is a diagnostic testing sequence which typically determines if the system volatile memory (such as random access memory (RAM), disk drives, peripheral devices and other hardware components are properly working. If the diagnostic determines that everything is in working order, the BIOS and the operating system will continue the boot process.

If the BIOS detects (block 32) that the suspend state was an S3 sleep state, the BIOS determines (block 36) if the currently active block or range of memory contains a valid resume vector. If so, the BIOS resumes (block 38) system booting as appropriate for resumption from an S3 sleep state. Thus, the resume vector is used to restore certain configurations of the operating system environment which were in place prior to the system entering the S3 sleep state. Absent a resume vector, the BIOS performs (block 34) a power on self test (POST) and the BIOS and operating system continue the boot process and until exiting the BIOS (block 40) leading to resumption of system operations.

DETAILED DESCRIPTION

In the following description, reference is made to the accompanying drawings which form a part hereof and which illustrate several embodiments. It is understood that other embodiments may be utilized and structural and operational changes may be made without departing from the scope of the descriptions provided.

Figure 3:
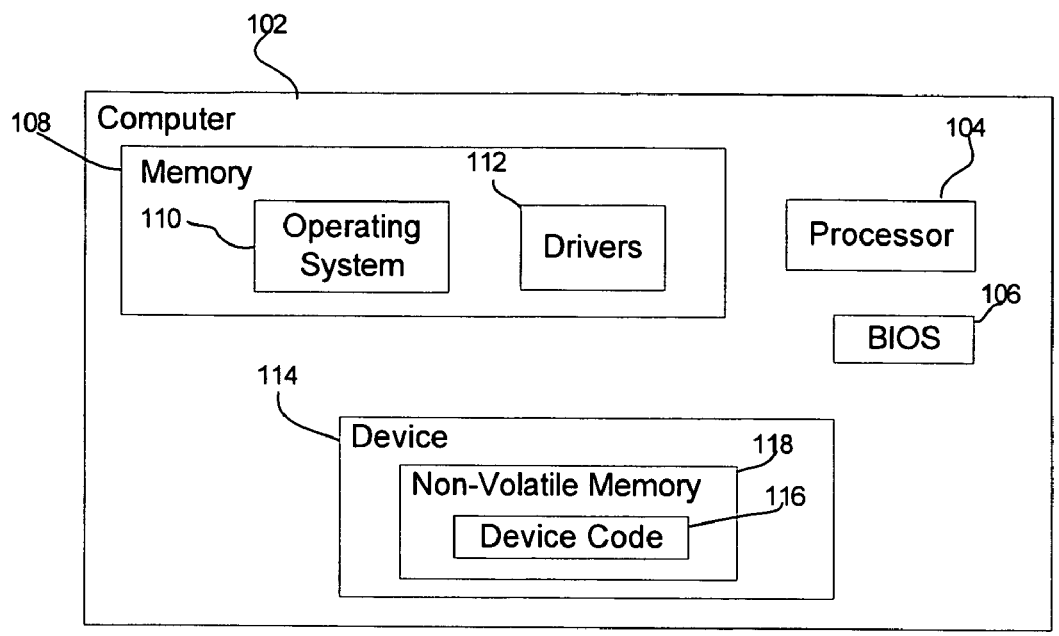
FIG. 3 illustrates an embodiment of a computing environment in which aspects of the present description may be utilized.

FIG. 3 illustrates a computing environment used with the described embodiments. A computer 102 includes a processor 104 (such as one or more central processing units (CPU)), a basic input/output system (BIOS) 106 including code executed by the processor 104 to initialize and control various computer 102 components (e.g., the keyboard, display screen, disk drives, serial communications, etc.) during a boot sequence. The computer 102 includes a memory 108, comprising one or more volatile memory devices, such as volatile random access memory (RAM), in which an operating system 110 and one or more drivers 112, such as a device driver interfacing with an attached device 114, are loaded into the memory 108 implementing a runtime environment. In some applications, the memory 8 may further include nonvolatile memory (e.g., a flash memory, Electronically Erasable Programmable Memory (EEPROM), optical disk drives, magnetic disk drives etc.)

There may be multiple device drivers providing interfaces to multiple attached devices. As part of the boot sequence, the device driver 112 may load device code 116 in a non-volatile memory 118 of the device 114 (e.g., a flash memory, Electronically Erasable Programmable Memory (EEPROM), etc.) into the memory 108. The device 114 may comprise any type of Input/Output (I/O) device internal or external to a housing of the computer 102, such as the case for an internal hard disk drive or video chipset, which may be integrated on the computer 102 motherboard or on an expansion card inserted in an expansion slot on the computer 102 motherboard). The BIOS 106 may be implemented in firmware in a non-volatile memory device on the computer 102 motherboard, such as a Flash memory, Read Only Memory (ROM), Programmable ROM (PROM), etc. The BIOS 106 code indicates the sequence of the boot operations. The operating system 110 may comprise a suitable operating system, such as a Microsoft® Windows® operating system, Linux™, Apple® Macintosh®, etc. (Microsoft and Windows are registered trademarks of Microsoft Corporation, Apple and Macintosh are registered trademarks of Apple Computer, Inc., and Linux is a trademark of Linus Torvalds).

Figure 4:
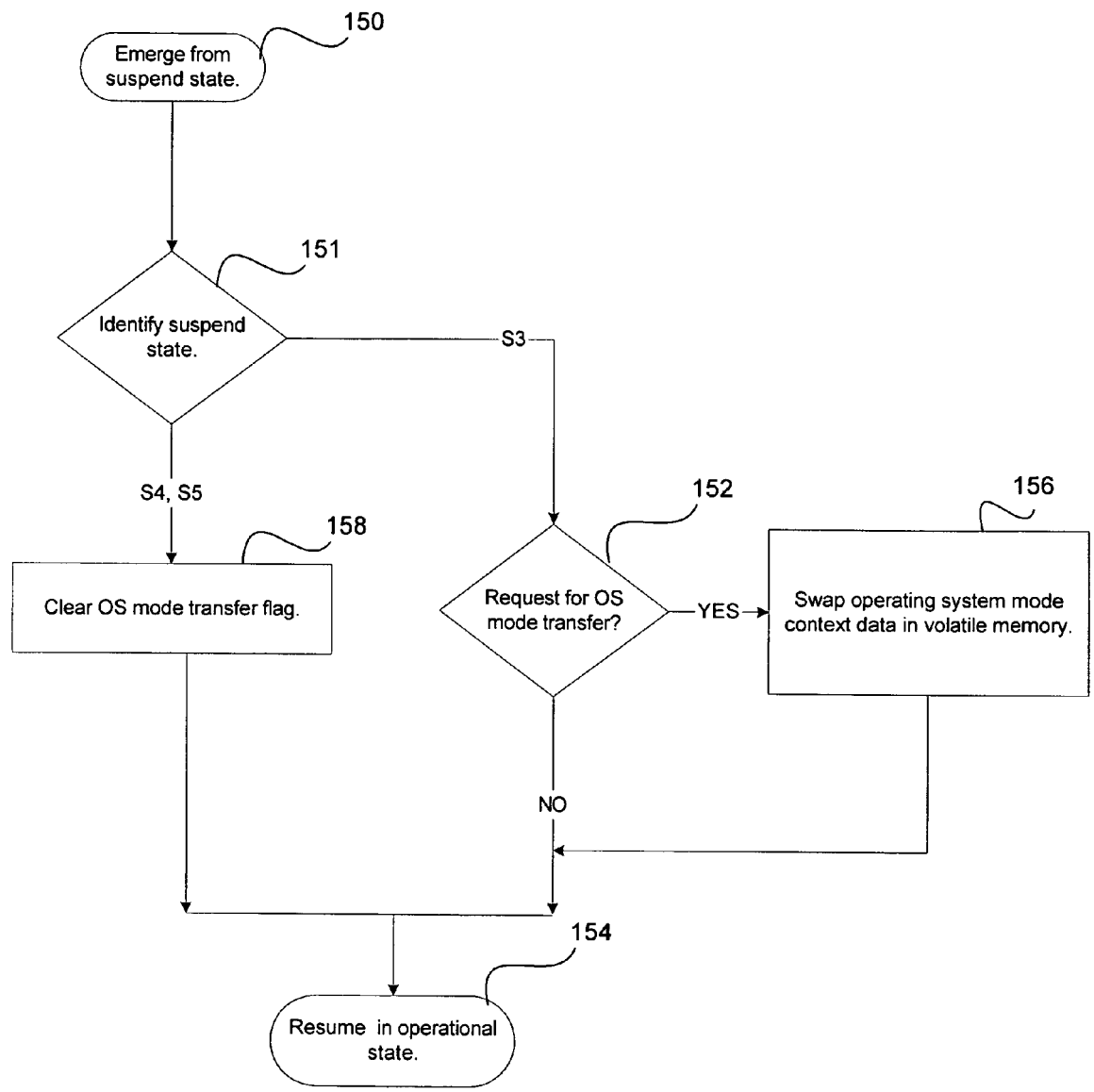
FIG. 4 illustrates an embodiment of operations to switch from one operating system mode to another operating system mode in accordance with one aspect of the present description.

FIG. 4 illustrates one example of operations to effectuate a transfer from one operating system mode to another, in accordance with one aspect of the description provided herein. In one application, it is believed that the switch from one operating system mode to another may be accomplished in a relatively short period of time, such as within a few seconds, for example. It is appreciated that in other applications, other or different benefits may be achieved.

In this embodiment, the system initially begins to emerge (block 150) from a suspend state such as a sleep state or a power state. In one example, in a manner similar to that shown in FIG. 2, upon power on, the basic input/output system (BIOS) may be entered to initiate a boot process. It is appreciated that other events and other software may be utilized to effectuate an operating system mode transfer. Again, in this embodiment, the BIOS identifies (block 151) the particular suspend state from which the system is emerging.

In accordance with one aspect of the present description, if the suspend state was identified an S3 sleep state, a further determination is made as to whether a transfer (block 152) in operating system modes has been requested. In one example, such a request may be indicated by the user previously setting an appropriate operating system mode transfer request flag as explained herein below. It is appreciated that a mode transfer may be requested in a variety of other techniques. As previously mentioned, an S3 sleep state is a suspend state in which the contents of volatile memory is maintained during the suspend state. It is appreciated that other suspend states, including other suspend states in which the contents of volatile memory is maintained, may be utilized, depending upon the particular application.

If no operating system mode transfer has been requested, the operational state of the operating system is resumed (block 154) without a change in operating system mode. Thus, for example, system booting may be resumed as appropriate for resumption from an S3 sleep state, leading to resumption of the operating system operational state. However, if an operating system mode transfer request has been determined (block 152), an operating system mode transfer may be effectuated by, in accordance with one aspect of the present description, swapping (block 156) operating system mode context data within the volatile memory, such as within the memory 108, for example. Thus, the context data for the current operating system mode when the suspend state was entered, may be swapped for the context data for the requested operating system mode. This swap may be a swap of all the memory range allocated to the initial operating system mode. Alternatively, a smaller swap may be effected.

For example, the swap may create within the memory range allocated to the initial operating system mode, a hole of a size such as 16 MB, for example, sufficient for the requested operating system mode to operate in. Again, an operational state of the operating system is resumed (block 154). In one example, system booting may be resumed using the context data for the requested operating system leading to resumption of the operational state of the operating system. However, the operating system mode is the requested operating system mode instead of the operating system mode in which the suspend state was entered.

If the suspend state was identified (block 151) as an S4 sleep state or S5 power state, in one embodiment, the operating system mode transfer request flag may be cleared (block 158). If the operating system mode transfer request flag was set and the suspend state is identified to be an S4 or S5 state instead of the S3 state, corruption may have occurred. Hence, the operating system mode transfer request flag may be cleared to facilitate operation of the system.

Again, the operational state of the operating system is resumed (block 154). Thus, for example, system booting may be resumed as appropriate for resumption from an S4 sleep state or S5 power state, leading to resumption of an operating system operational state.

Figure 5:
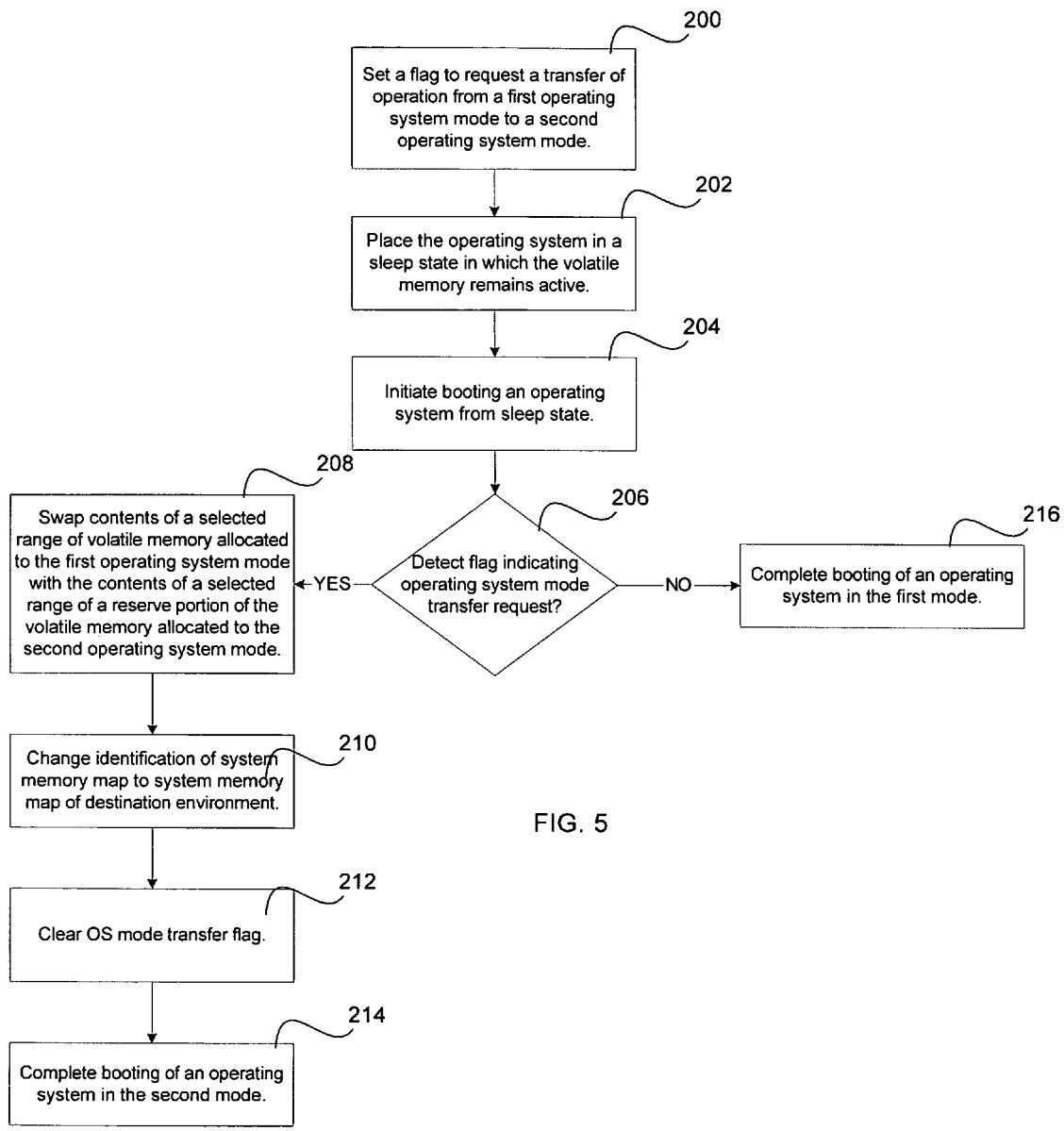
FIG. 5 illustrates another embodiment of operations to switch from one operating system mode to another operating system mode in accordance with an aspect of the present description.

FIG. 5 illustrates another example of operations to effectuate a transfer from one operating system mode to another. In this example, a flag may be set (block 200) to request a transfer of operation from a first operating system mode, such as a general purpose mode, to a second operating system mode, such as a single function mode. Although this example describes switching between a general purpose mode and a single function mode, it is appreciated that a variety of different modes of operation may be utilized including modes having a more limited range of activities as compared to a general purpose mode, and a more expanded ranged of activities as compared to a single purpose mode. Moreover, it is appreciated that a switch in mode may be between the same or different operating systems.

In the illustrated embodiment, a flag may be set by actuating a "hot key" which may be a physical key on a keyboard or may be a combination of standard keys. For example, a combination of Control-Alt-Shift-F6 may be used to set an operating system mode transfer request flag. It is appreciated that a variety of combinations of keys may be used, particularly those combinations which are not utilized for other functions. In this embodiment, an ACPI SLP_Button is described in the BIOS to create a "hot key." It is further appreciated that other mechanisms and signaling functions may be used to set an operating system mode transfer request flag.

In this example, the hot key handler such as an ACPI hot key handler may be programmed to set a bit in nonvolatile memory such as system NVRAM, for example, in response to actuation of the hot key. This bit may be toggled to set or reset an operating system mode transfer request flag. In the illustrated embodiment, bit 0 at NVRAM offset 0xA0 is utilized as the toggle bit but it is appreciated that other bits may be utilized as well. It is further appreciated that an operating system mode transfer request flag may be stored in a file or other location in memory such as a hard drive.

In another operation, the operating system is placed (block 202) in a sleep state in which certain system devices including volatile memory remain active during the sleep state. Among the ACPI defined sleep states, such sleep states include the sleep state designated "S3". It is appreciated however that the sleep state may vary depending upon the particular application.

In this example, the transition to the sleep state S3 is triggered by the actuation of the hot key used to set an operating system mode transfer request flag. For example, the hot key handler may be programmed to cause the operating system to transition to a sleep state such as the S3 sleep state. It is appreciated that the sleep state transition may occur in response to other events, depending upon the particular application.

Figure 1:
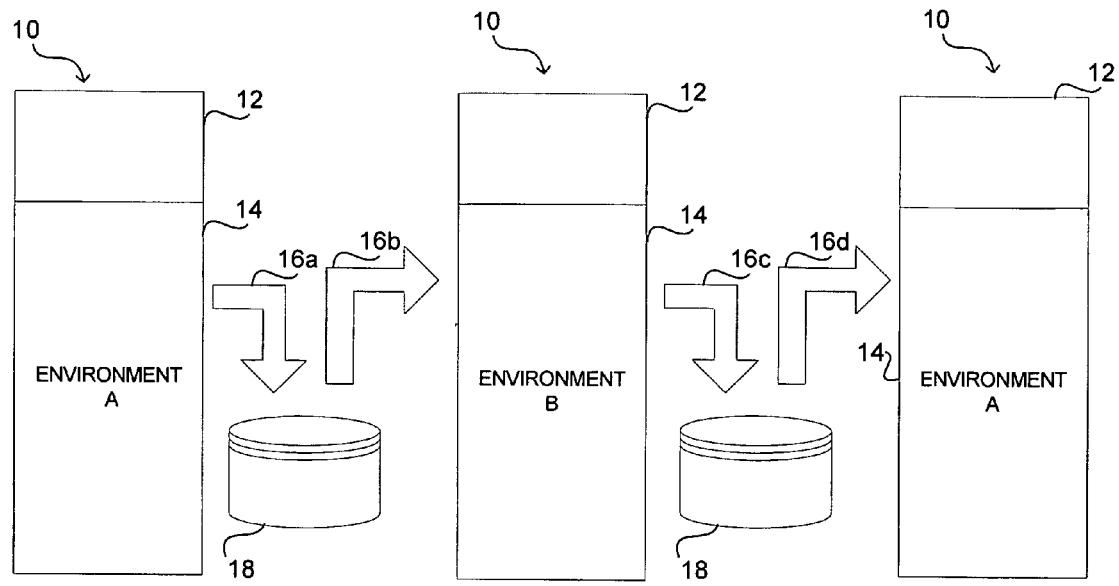
FIG. 1 illustrates an example of prior art operations to switch from one operating system mode to another operating system mode.
Figure 6:
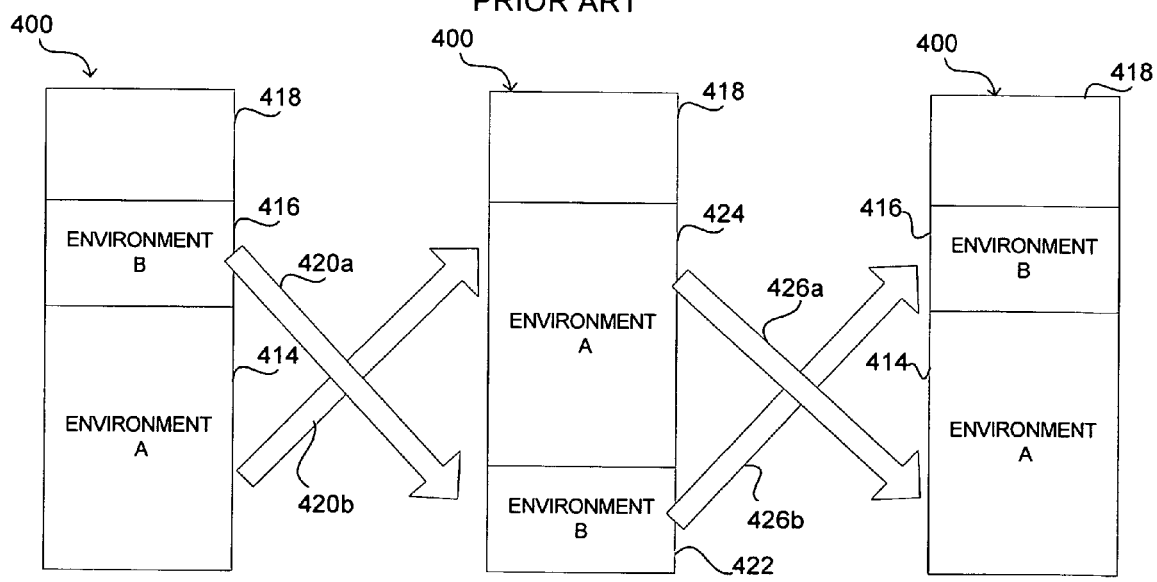
FIG. 6 illustrates an embodiment of memory swapping operations to switch from one operating system mode to another operating system mode in accordance with an aspect of the present description.

A boot operation is initiated (block 204) from the sleep state. As the system begins to resume operations from the sleep state, it begins to follow a path similar to that of a normal boot from the S3 sleep state. However, in the course of this boot operation, a flag indicating an operating system mode transfer request may be detected (block 206). As previously mentioned, an operating system mode transfer request flag may be set by setting a bit in the system NVRAM, for example. If the operating system mode transfer request flag is detected, the contents of a selected range of volatile memory allocated to the first operating system mode may be swapped (block 208) with the contents of a selected range of a reserve portion of the volatile memory allocated to the second operating system mode. This swap is schematically represented in FIG. 6 which shows an example of an address space 400 schematically represented by ranges 414, 416 and 418 of volatile memory locations. These memory locations may be within a device memory mapped input/output (MMIO) address space of a PCI bus, for example. It is appreciated that other addressing schemes and other busses may be utilized. For example, any suitable bus interface, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc or another type of peripheral bus.

In this example, context data for the current operating system environment, represented as Environment A, resides in volatile memory in memory range 414. In addition, context data for a selectable alternate operating system mode, represented as Environment B, resides in volatile memory in a reserve portion designated as memory range 416. Thus, if the operating system mode transfer request flag is detected (block 206), the contents of the memory range 414 containing the context data for the current operating system mode, represented as Environment A, may be swapped (block 208, arrows 420a, 420b) with the contents of the memory range 416 containing the context data for the alternate operating system mode, represented as Environment B. As a consequence of the swap, the Environment B context data resides as the contents of an active memory range 422. Conversely, the Environment A context data resides as the contents of a reserve memory range 424.

In many operating systems, a block of memory may be marked as reserved in a memory map table. Such a memory map may be generated using a variety of techniques. For example, an ACPI compliant BIOS can generate a memory map with an E820 call such that the memory map table is often referred to as an "E820 table." Each operating system mode may have a separate E820 table. Accordingly, in switching from one operating system mode to another, the identification of the system memory map may be changed (block 210) to the system memory map of the selected or destination environment. Thus, in this example, the identification of the E820 table of the current operating system mode may be changed from the E820 table of Environment A to the E820 table of Environment B. It is appreciated that memory maps may be generated and identified in a variety of techniques, depending upon the particular application.

In another operation, the operating system transfer request flag may be cleared (block 212) and the booting of the system in the alternate operating system mode may be completed (block 214) using the Environment B context data and the Environment B memory map table.

In one example, system booting may be resumed in a manner similar to that described in connection with FIG. 2. Thus, the BIOS may determine (block 36) if the currently active block or range of memory contains a valid resume vector for Environment B. If so, the BIOS resumes (block 38) system booting as appropriate for resumption from an S3 sleep state. Thus, the resume vector may be used to restore certain configurations of the system which were in place the last time the system was in the alternate operating system mode. The booting process continues until the BIOS exits (block 40) and the booting of the operating system is complete (block 214) in the alternate mode. If there is no valid resume vector, the BIOS performs (block 34) a power on self test (POST) and the BIOS and operating system continue the boot process until the BIOS exits (block 40) and the booting of the operating system is complete (block 214) in the alternate mode.

Figure 2:
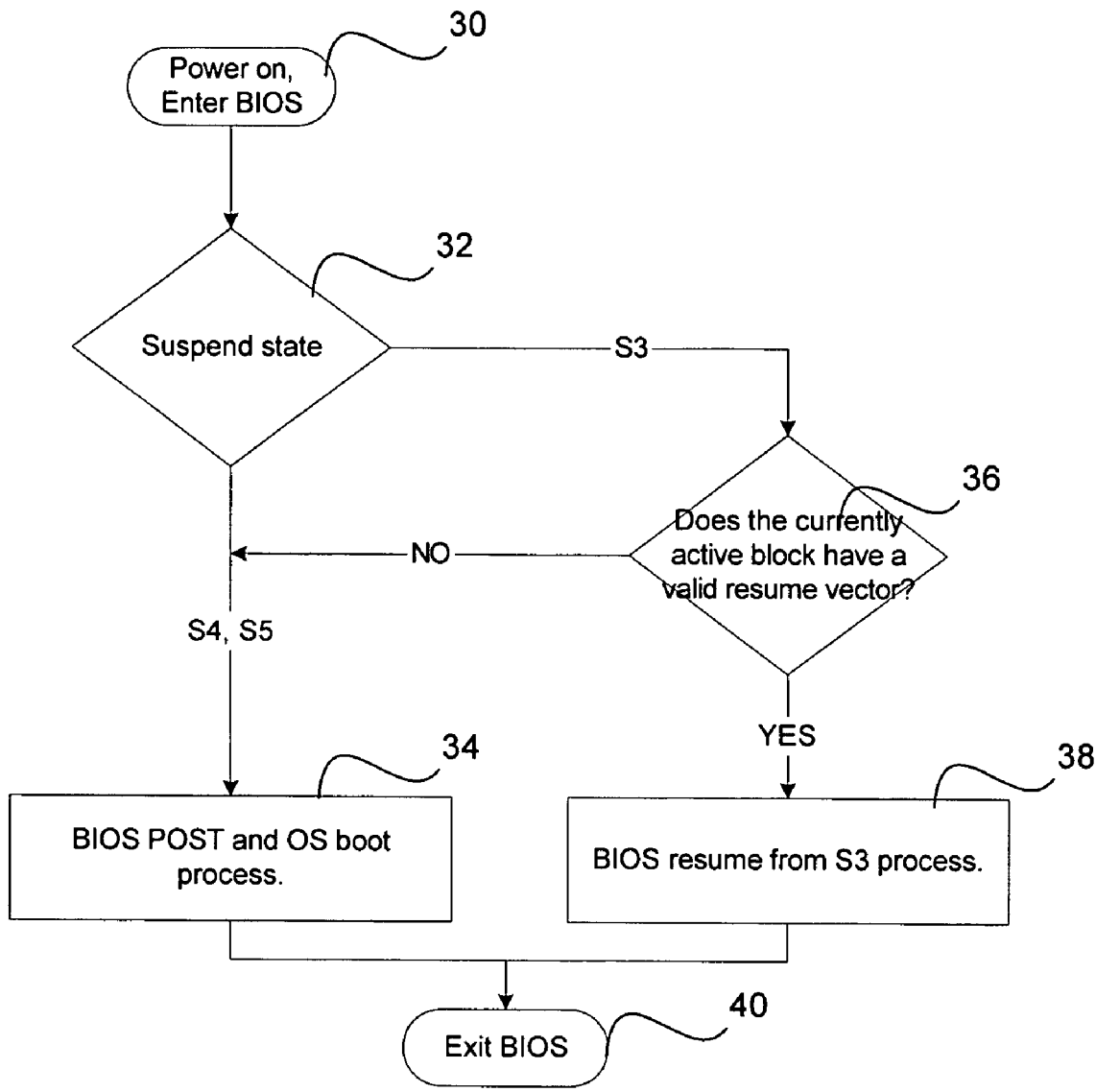
FIG. 2 illustrates an example of prior art operations to resume operations from a suspend state.

If in the course of the initial boot operation, a flag indicating an operating system mode transfer request is not detected (block 206), system booting may be resumed (block 216) in a manner similar to that described, for example, in connection with FIG. 2. Thus, the BIOS may perform (block 34) a power on self test (POST). If the diagnostic determines that everything is in working order, the BIOS and the operating system will continue the boot process until the BIOS exits (block 40) and the booting of the operating system is complete (block 216 with the mode unchanged.

Figure 7:
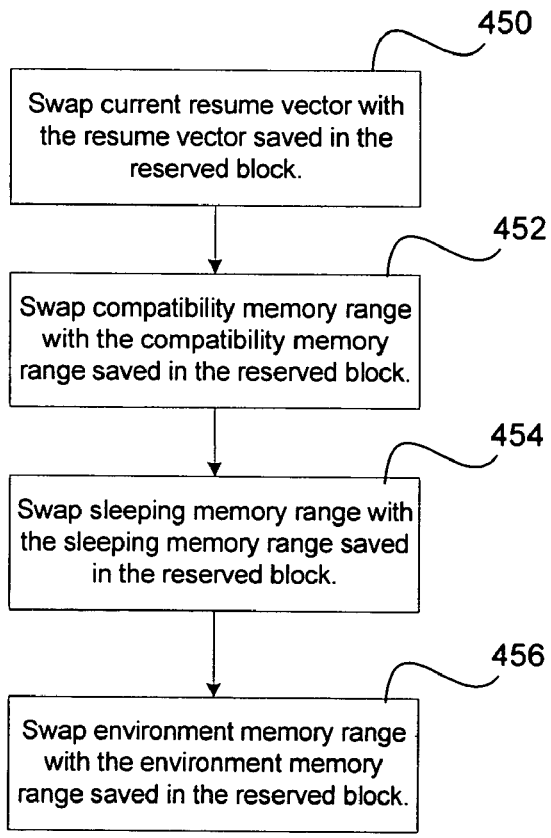
FIG. 7 illustrates another embodiment of memory swapping operations to switch from one operating system mode to another operating system mode in accordance with an aspect of the present description.

FIG. 7 illustrates one example, in greater detail, of operations for swapping (block 208, FIG. 5) the contents of a selected range of volatile memory allocated to the first operating system mode with the contents of a selected range of a reserve portion of the volatile memory allocated to the second operating system mode as schematically represented in FIG. 6. In this example, the current resume vector (of Environment A) stored in the memory range 414 is swapped (block 450) with the resume vector (of Environment B) saved in the reserved block (memory range 416). Thus, the resume vector of Environment B is swapped into the active memory range 422 of the volatile memory.

In many operating systems, the first 0-640 KB of active memory provide a "compatibility" memory which provides application executable memory for many systems. It is appreciated that the size and location of compatibility memory may vary, depending upon the particular application.

Here, in another operation, the contents of the compatibility memory range (of Environment A) stored within the memory range 414 is swapped (block 452) with the contents of the compatibility memory range (of Environment B) saved in the reserved block (memory range 416). Thus, the contents of the compatibility memory range of Environment B is swapped into the compatibility memory range within the active memory range 422 of the volatile memory.

In many operating systems, a "sleeping" memory, such as the ACPI Non-Volatile Sleeping (NVS) memory may be reserved by the BIOS for its use. It is appreciated that the size and location of sleeping memory may vary, depending upon the particular application.

In another operation, the contents of the sleeping memory range (of Environment A) stored within the memory range 414 is swapped (block 454) with the contents of the sleeping memory range (of Environment B) saved in the reserved block (memory range 416). Thus, the contents of the sleeping memory range of Environment B is swapped into the sleeping memory range within the active memory range 422 of the volatile memory.

In many operating systems, a memory range of contiguous physical memory addresses, referred to herein as an "environment memory" may be needed for proper loading of an operating system upon boot up. For example, such a contiguous memory range may be placed within the 1 MB to 8 MB range. It is appreciated that the size and location of the environment memory range may vary, depending upon the particular application.

In yet another operation, the contents of one environment memory range for one environment (Environment A) stored within the memory range 414 is swapped (block 456) with the contents of the other environment memory range for the other environment (Environment B) saved in the reserved block (memory range 416). Thus, the contents of the Environment B environment memory range is swapped into the active memory range 422 of the volatile memory.

At this point, context data of Environment B including the resume vector, compatibility memory contents, sleeping memory contents and environment memory contents of Environment B are loaded into the active memory range 422 to facilitate booting to the alternate operating system mode associated with Environment B. Conversely, context data of Environment A including the resume vector, compatibility memory contents, sleeping memory contents and environment memory contents of Environment A are loaded into the reserve memory range 424 to save this data should the user later elect to revert to the operating system mode associated with Environment A.

If the user subsequently requests a switch back to the original operating system mode associated with Environment A, the context data of Environments A and B may be swapped again as shown by the arrows 426a, 426b in FIG. 6. At this point, context data of Environment A including the resume vector, compatibility memory contents, sleeping memory contents and environment memory contents of Environment A are loaded back into the active memory range 414 to facilitate booting to the original operating system mode associated with Environment A. Conversely, context data of Environment B including the resume vector, compatibility memory contents, sleeping memory contents and environment memory contents of Environment B are loaded back into the reserve memory range 416 to save this data should the user later elect to revert to the alternate operating system mode associated with Environment B. Again, the identification of the E820 table of the current operating system mode may be changed from the E820 table of Environment B back to the E820 table of Environment A.

As the system boots, it may be the first time that a particular operating system mode has been entered since the last cold boot, such as a boot from power state S5. Thus, if the operating system mode associated with an environment has not previously been entered, complete context data for that environment may not have been previously saved in the reserve portion for swapping with the context data of the other environment. If so, a normal boot sequence including a BIOS POST may be followed. In addition, the user may be provided an opportunity to select from various bootable choices including selecting the operating system mode of operation. Thus, for example, if the first operating system mode entered is the operating system mode associated with Environment A, for example, and the user subsequently requests a switch to an alternate operating system mode associated with Environment B, for example, context data for Environment A may be saved in the reserve range 424 as the system emerges from an S3 sleep state as discussed above. If the operating system mode associated with Environment B has not previously been entered since the last cold start, a normal boot sequence including a BIOS POST may be followed and the user may be given the option of booting in the alternate operating system mode. In this manner, the context data of Environment B may be loaded, from nonvolatile storage, for example, into the volatile memory range 422 for the first time.

Figure 8:
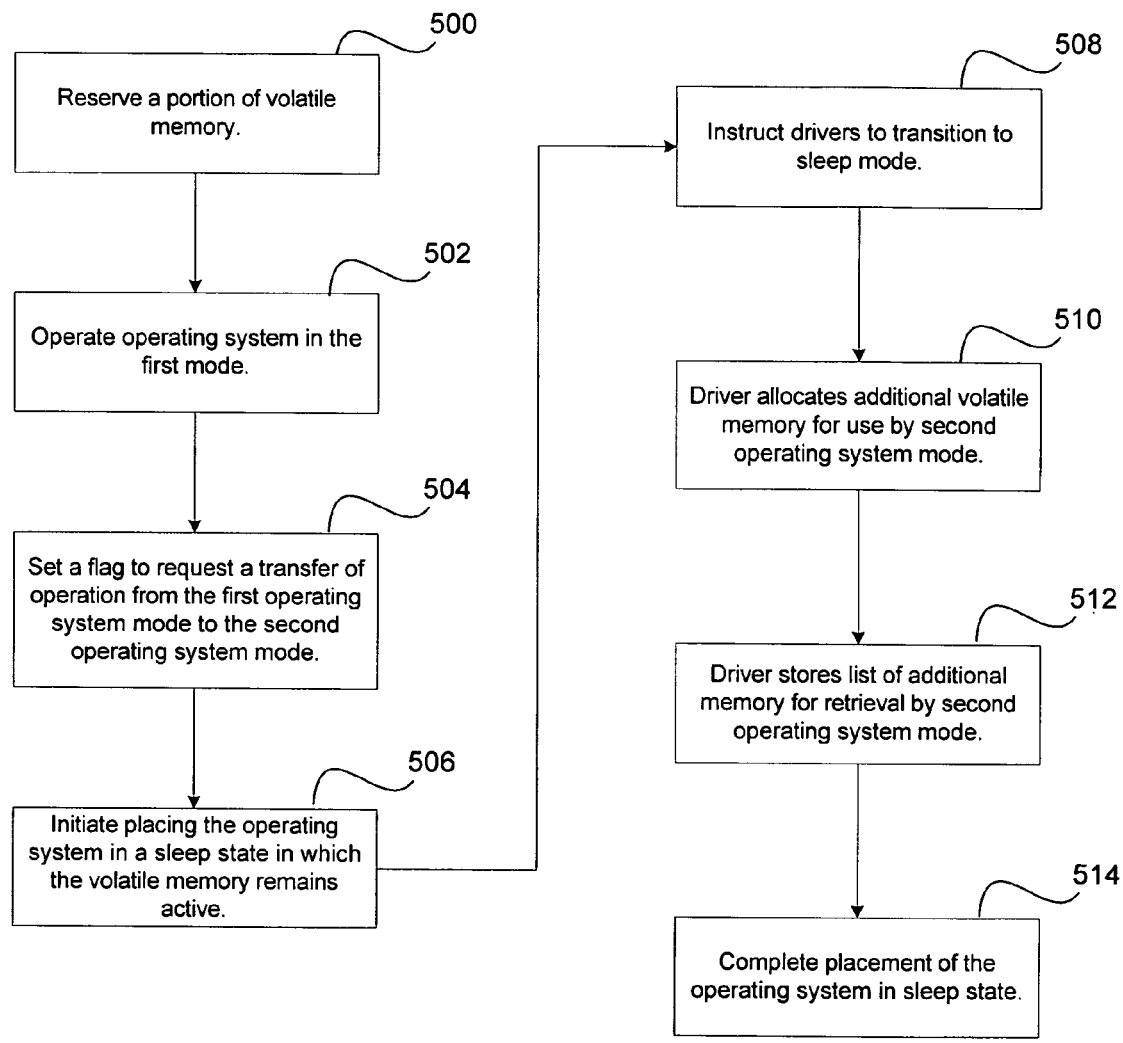
FIG. 8 illustrates yet another embodiment of operations to switch from one operating system mode to another operating system mode in accordance with an aspect of the present description.

FIG. 8 illustrates another example of operations to prepare a system for transfer from one operating system mode to another. In one operation, a portion of volatile memory is reserved (block 500) to facilitate transfer between operating system modes. The reservation of the reserve portion of memory may occur as the system is initially booting. Thus, the reserve memory portion may be allocated in an E820 memory map, for example, provided to the initial operating system mode. It is appreciated that a reserve memory portion may be allocated at other times, utilizing other techniques, depending upon the particular application.

In one embodiment, the reserve memory portion allocated may be of sufficient size to accommodate the entire context data of the environment of the alternate operating system mode. Thus, the reserve memory portion may be relatively large, such as 16-64 megabytes, for example, to accommodate the context data of a typical operating system mode. In an alternative embodiment, a smaller portion may be allocated. For example, in one application, eight megabytes may initially be allocated for a reserve memory portion notwithstanding that the complete context data of an environment associated with an operating system mode may utilize a substantially larger amount of memory to preserve all the context data of that environment should a switch to another operating system mode be initiated. However, for many operating system modes, there is often a minimum memory range, such as eight megabytes, for example, to accommodate an operating system bootstrap handler. In one embodiment, the reserve memory portion may be preloaded from nonvolatile storage with a bootstrap handler associated with the alternate operating system mode. As explained below, the remainder of the memory for storing the remaining environment context data of the alternate operating system mode may be dynamically allocated in response to a request to switch to an alternate operating system mode.

Upon booting the system in the initial operating system mode, a user may continue to operate (block 502) the system in the initial operating system mode. Should the user wish to switch to an alternate operating system mode, a flag may be set (block 504). If so, the system may initiate (block 506) placing the operating system and portions of the system itself in a sleep state, such as state S3, in which the volatile memory containing the environment context data of the current operating system remains active.

As the operating system begins to transition to the sleep state, a message may be sent (block 508) by the operating system, for example, instructing the drivers to transition to a sleep state such as the D3 state, for example. An operating system mode transfer driver, programmed in accordance with one embodiment of the present description, may allocate (block 510) additional volatile memory to be used for the operating system mode transfer. The additional memory may be allocated in the form of contiguous or noncontiguous pages, for example, using standard memory management routines provided by a typical operating system. It is appreciated however, that the form and method of memory allocation may vary, depending upon the particular applications.

Figure 9:
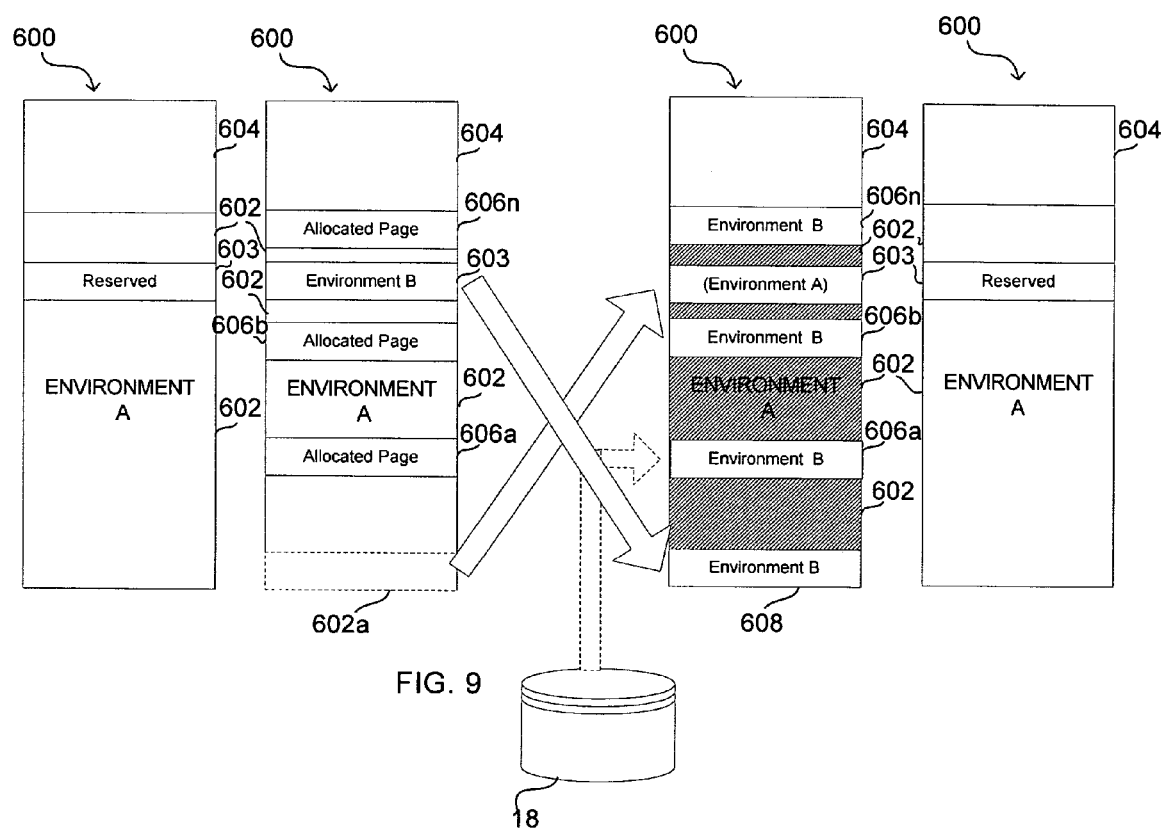
FIG. 9 illustrates another embodiment of memory swapping operations to switch from one operating system mode to another operating system mode in accordance with an aspect of the present description.

FIG. 9 shows one example of an address space 600 schematically represented by ranges 602, 603 and 604 of memory locations. In this example, context data of the current operating system environment for the current operating system mode, represented as Environment A, resides in volatile memory in a memory range 602. A portion 603 of the memory space 600 may be reserved (block 500) for use in alternating operating system modes. In one embodiment, reserve memory portion 603 may be preloaded from nonvolatile storage 18 with a bootstrap handler of Environment B associated with the alternate operating system mode.

As set forth above, an operating system mode transfer driver, programmed in accordance with one embodiment of the present description, may temporarily allocate (block 510) additional volatile memory ranges in the form of contiguous or noncontiguous pages, for example, as represented by noncontiguous blocks of pages 606a, 606b . . . 606n for use by an alternate operating system mode. In one embodiment, these pages or blocks of pages 606a, 606b . . . 606n may be swapped into the memory space 600 and locked into place. For example, the Windows XP application programming interface (API) call to accomplish this is the MmProbeAndLockPages( ). Other operating systems have other calls to accomplish this. It is therefore appreciated that the allocation of additional memory may be obtained using a variety of techniques, depending upon the particular application.

In another operation, the driver stores (block 512) a list of the additional allocated memory for retrieval by the alternate operating system mode. In one embodiment, the list of the pages or blocks of pages 606a, 606b . . . 606n may be stored in a well defined location which, depending upon the particular application, may be accessible to both the operating system mode transfer driver of the current operating system mode as well as the operating system in the alternate operating system mode. One such location may be defined by a memory map table such as an E820 table, for example. It is appreciated that the location may vary, depending upon the particular application. For example, other locations for storing the list of additional memory include a file on a disk drive nonvolatile storage 18, or other nonvolatile memory including flash memory, or other types of memory.

In one embodiment, upon completing (block 514) placement of the current mode of the operating system in sleep mode, operation of the system may be resumed in a manner similar to that described above in connection with FIG. 4. However, in this embodiment, a portion 602a of the context data of Environment A is swapped with the contents of the reserve portion 603. Accordingly, a portion of the context data of Environment A is stored in the reserve portion 603 to retain that context data should the user select to revert to the operating system mode associated with Environment A. Conversely, the prior contents of the reserve portion 603, such as the bootstrap handler of Environment B, is swapped into the memory range 608 which previously contained the contents of memory range 602a of Environment A. Alternatively, the contents of memory range 608 may be loaded with a bootstrap handler for Environment B from nonvolatile storage 18.

Once the bootstrap handler for Environment B associated with the alternate operating system is loaded into the memory range 608, the bootstrap handler can utilize memory management routines, modified as appropriate, to use the list of the pages or blocks of pages 606a, 606b ... 606n which were allocated by the operating system mode transfer driver. In this manner, the additional memory pages 606a, 606b ... 606n may be utilized by the alternate operating system and filled with context data of Environment B.

Should the user elect to suspend the alternate operating system mode associated with Environment B, and resume the primary operating system mode associated with Environment A, the operating system mode transfer driver may be configured to save the allocation of the pages or blocks of pages 606a, 606b ... 606n in memory (and their contents) to facilitate a transition back to the alternate operating system mode associated with Environment B should the user subsequently so elect. Alternatively, the operating system mode transfer driver may be configured to release the allocation of the pages or blocks of pages 606a, 606b ... 606n in memory which may enhance operation in the operating system mode associated with Environment A. Accordingly, if the allocated memory is to be released, the context data of Environment B stored in the allocated memory ranges may be saved in non-volatile storage. Also, a portion of the context data of Environment B, such as the bootstrap handler of Environment B, may be swapped into the reserve memory portion 603.

In a system is operating with the operating system mode associated with Environment A, the memory ranges containing context data of Environment B may be locked to isolate those memory ranges from the memory ranges containing the context data of Environment A. Conversely, in a system is operating with the operating system mode associated with Environment B, the memory ranges containing context data of Environment A may be locked to isolate those memory ranges from the memory ranges containing the context data of Environment B. Thus, the memory ranges 602 and reserve memory portion 603 may be locked and isolated from the memory ranges 608 and 606a, 606b ... 606n as the system operates in the alternate operating system mode associated with Environment B.

A variety of techniques may be used to lock and isolate a memory range for one operating system environment from another memory range for another operating system environment. For example, the LaGrande Technology (LT) provided by Intel Corporation provides memory isolation in the form of a NoDMA (no direct memory access) table. The Vanderpool Technology (VT) provided by Intel Corporation may facilitate memory management by the secondary operating system mode, using the Guest Physical address to Host Physical address remapping capability of VT. Furthermore, management of these hardware mechanism by the BIOS may provide sufficient isolation for compliance with content licensing restrictions as well as facilitating implementation of operating system mode switching utilizing dynamic allocation of additional memory.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any suitable information bearing medium.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention. Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), if will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

In certain implementations, the embodiments may be included in a computer system including nonvolatile memory and a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, embodiments may be included in a system that does not include nonvolatile memory or a storage controller, such as certain hubs and switches.

In certain implementations, the embodiments may be implemented in a computer system including a video controller to render information to display on a monitor coupled to the computer system including the host software driver and network controller, such as a computer system comprising a desktop, workstation, server, mainframe, laptop, handheld computer, etc. Alternatively, the network controller and host software driver embodiments may be implemented in a computing device that does not include a video controller, such as a switch, router, etc.

The illustrated logic of FIGS. 4-9 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The devices 114 of the architecture of the system 102 may include a network controller to enable communication with a network, such as an Ethernet, a Fibre Channel Arbitrated Loop, etc. Further, the architecture may, in certain embodiments, include a video controller to render information on a display monitor, where the video controller may be implemented on a video card or integrated on integrated circuit components mounted on the motherboard.

An input device may be used to provide user input to the processor 104, and may include a keyboard, mouse, pen-stylus, microphone, touch sensitive display screen, or any other suitable activation or input mechanism. An output device may be capable of rendering information transmitted from the processor 104, or other component, such as a display monitor, printer, storage, etc.

The embodiments of the present description may be implemented on an expansion card such as a network card, such as a Peripheral Component Interconnect (PCI) card or some other card, or on integrated circuit components mounted on the motherboard.

The foregoing description of various embodiments has been presented for the purposes of illustration. It is not intended to be exhaustive or to limit to the precise form disclosed. Many modifications and variations are possible in light of the above teaching.

What is claimed is:

1. A method, comprising:
   operating a system in a first mode of an operating system loaded in a volatile memory of a system;
   setting a flag to request a transfer of operation from said first operating system mode to a second operating system mode of said operating system;
   placing said operating system of said system in a sleep state in which said volatile memory remains active;
   initiating booting of said operating system from said sleep state;
   detecting said flag indicating said operating system mode transfer request;
   in response to said flag detection, swapping contents of a selected range of said volatile memory allocated to said first operating system mode with the contents of a selected range of a reserve portion of said volatile memory allocated to said second operating system mode; and
   completing booting of said operating system in said second mode.

2. The method of claim 1 wherein said second operating system mode is a mode of operation which is more restricted than the first operating system mode.

3. The method of claim 1 wherein said swapping includes swapping in said volatile memory, a current resume vector for said first operating system mode with a second resume vector in said volatile memory reserve portion for said second operating system mode.

4. The method of claim 1 wherein said swapping includes swapping the contents of a compatibility memory range with the contents of a compatibility memory range saved in said volatile memory reserve portion for said second operating system mode.

5. The method of claim 1 wherein said swapping includes swapping the contents of a sleeping memory range with the contents of a sleeping memory range saved in said volatile memory reserve portion for said second operating system mode.

6. The method of claim 1 wherein said swapping includes swapping the contents of an environment memory range for said first operating system mode with the contents of an environment memory range for said second operating system mode saved in said volatile memory reserve portion.

7. The method of claim 6 further comprising in response to said flag detection, changing the identification of a system memory map to identify a system memory map for said second operating system mode, and clearing said flag.

8. The method of claim 1 wherein said sleep state placing includes allocating additional reserve portions of said volatile memory for use by said second operating system mode.

9. The method of claim 8 wherein sleep state placing further includes storing a list of said additional reserve portions of said volatile memory in a location accessible by said operating system in said second operating system mode.

10. The method of claim 9 further comprising said second operating system mode identifying said additional reserve portions of said volatile memory using said list and said second operating system mode using said additional reserve portions of said volatile memory.

11. An article comprising a medium having a plurality of machine accessible instructions, wherein when the instructions are executed by a system including a host processor, at least one operating system and a volatile memory, the instructions provide for:
   operating said system in a first mode of an operating system loaded in said volatile memory of said system;
   in response to a flag being set to request a transfer of operation from said first operating system mode to a second operating system mode of said operating system:
      placing said operating system of said system in a sleep state in which said volatile memory remains active;
      initiating booting of said operating system from said sleep state;
      detecting said flag indicating said operating system mode transfer request; and
      in response to said flag detection, swapping contents of a selected range of said volatile memory allocated to said first operating system mode with the contents of a selected range of a reserve portion of said volatile memory allocated to said second operating system mode; and completing booting of said operating system in said second mode.

12. The article of claim 11 wherein said second operating system mode is a mode of operation which is more restricted than the first operating system mode.

13. The article of claim 11 wherein the instructions providing for said swapping include instructions further providing for swapping in said volatile memory, a current resume vector for said first operating system mode with a second resume vector in said volatile memory reserve portion for said second operating system mode.

14. The article of claim 11 wherein the instructions providing for said swapping include instructions further providing for swapping the contents of a compatibility memory range with the contents of a compatibility memory range saved in said volatile memory reserve portion for said second operating system mode.

15. The article of claim 11 wherein the instructions providing for said swapping include instructions further providing for swapping the contents of a sleeping memory range with the contents of a sleeping memory range saved in said volatile memory reserve portion for said second operating system mode.

16. The article of claim 11 wherein the instructions providing for said swapping include instructions further providing for swapping the contents of an environment memory range for said first operating system mode with the contents of an environment memory range for said second operating system mode saved in said volatile memory reserve portion.

17. The article of claim 11 wherein the instructions further provide for:

in response to said flag detection, changing the identification of a system memory map to identify a system memory map for said second operating system mode, and clearing said flag.

18. The article of claim 11 wherein the instructions providing for said sleep state placing include instructions further providing for allocating additional reserve portions of said volatile memory for use by said second operating system mode.

19. The article of claim 18 wherein the instructions providing for said sleep state placing include instructions further providing for storing a list of said additional reserve portions of said volatile memory in a location accessible by said operating system in said second operating system mode.

20. The article of claim 19 wherein the instructions further provide for:

said second operating system mode identifying said additional reserve portions of said volatile memory using said list and said second operating system mode using said additional reserve portions of said volatile memory.

21. A system, comprising:

logic which includes a host processor, a memory adapted to maintain at least one operating system wherein said memory includes a volatile memory adapted to maintain a reserve portion, and a storage controller, wherein the logic is adapted to:

operate said system in a first mode of an operating system loaded in said volatile memory of said system;

in response to a flag being set to request a transfer of operation from said first operating system mode to a second operating system mode of said operating system:

place said operating system of said system in a sleep state in which said volatile memory remains active;

initiate booting of said operating system from said sleep state;

detect said flag indicating said operating system mode transfer request; and in response to said flag detection, swap contents of a selected range of said volatile memory allocated to said first operating system mode with the contents of a selected range of a reserve portion of said volatile memory allocated to said second operating system mode; and complete booting of said operating system in said second mode.

22. The system of claim 21 wherein said second operating system mode is a mode of operation which is more restricted than the first operating system mode.

23. The system of claim 21 wherein the logic adapted for said swapping is further adapted to swap in said volatile memory, a current resume vector for said first operating system mode with a second resume vector in said volatile memory reserve portion for said second operating system mode.

24. The system of claim 21 wherein the logic adapted for said swapping is further adapted to swap the contents of a compatibility memory range with the contents of a compatibility memory range saved in said volatile memory reserve portion for said second operating system mode.

25. The system of claim 21 wherein the logic adapted for said swapping is further adapted to swap the contents of a sleeping memory range with the contents of a sleeping memory range saved in said volatile memory reserve portion for said second operating system mode.

26. The system of claim 21 wherein the logic adapted for said swapping is further adapted to swap the contents of an environment memory range for said first operating system mode with the contents of an environment memory range for said second operating system mode saved in said volatile memory reserve portion.

27. The system of claim 21 wherein the logic is further adapted to:

in response to said flag detection, change the identification of a system memory map to identify a system memory map for said second operating system mode, and clear said flag.

28. The system of claim 21 wherein the logic adapted for said sleep state placing is further adapted to allocate additional reserve portions of said volatile memory for use by said second operating system mode.

29. The system of claim 28 wherein the logic adapted for said sleep state placing is further adapted to store a list of said additional reserve portions of said volatile memory in a location accessible by said operating system in said second operating system mode.

30. The system of claim 29 wherein the logic is further adapted to: identify in said second operating system mode, said additional reserve portions of said volatile memory using said list and use by said second operating system mode, said additional reserve portions of said volatile memory.

* * * * *